United States Patent [19]

Bernard, Jr.

[11] Patent Number: 4,637,911

[45] Date of Patent: Jan. 20, 1987

[54] APPARATUS AND METHOD FOR CLOSED-LOOP CONTROL OF REACTOR POWER

[75] Inventor: John A. Bernard, Jr., Needham Heights, Mass.

[73] Assignee: Massachusetts Institute of Technology, Cambridge, Mass.

[21] Appl. No.: 633,939

[22] Filed: Jul. 24, 1984

[51] Int. Cl.[4] ............................................... G21C 7/36
[52] U.S. Cl. ..................................... 376/217; 376/908
[58] Field of Search ................ 376/216, 217, 218, 908

[56] References Cited

U.S. PATENT DOCUMENTS

| | | | |
|---|---|---|---|
| 4,318,778 | 3/1982 | Musick | 376/216 |
| 4,400,343 | 8/1983 | Izumi et al. | 376/217 |
| 4,459,259 | 7/1984 | Colley | 376/216 |

Primary Examiner—Peter A. Nelson
Attorney, Agent, or Firm—Kenway & Jenney

[57] ABSTRACT

Closed-loop controller for altering the power level of nuclear reactors in a safe manner and without overshoot. Apparatus is provided for moving a control element such as a control rod or for adjusting the concentration of a soluble neutron absorber (chemical shim) for altering the nuclear reactor power level. A computer computes at short time intervals the two functions $[\rho - |\dot{\rho}|/\lambda_e]/|\dot{\rho}|$ and $\tau_i \ln(P_F/P_i)$. The direction of motion of the control element is altered when these two functions become equal thereby resulting in the attainment of a new power level without overshoot. In a preferred embodiment, these two functions are computed at intervals of approximately one second.

16 Claims, 6 Drawing Figures

APPARATUS AND METHOD FOR CLOSED-LOOP CONTROL OF REACTOR POWER

BACKGROUND OF THE INVENTION

This invention relates to the control of nuclear reactors and more particularly to the closed-loop control of reactor power.

To change the steady state power level of a nuclear reactor, neutron-absorbing control elements such as control rods or shim blades are moved in and out of the reactor core. Also, certain soluble chemicals may be used as the control element. For example, to increase the power of a nuclear reactor, the control rods are moved outwardly so that the neutron population can build up to a level consistent with the higher output level. Once the population has increased to the suitable level, the control rods are reinserted to their original position less the impact of feedback effects such as temperature and voids on the reactor's neutron population. Alternatively, if chemical poisons were being used, the concentration of the chemical would be decreased, the power allowed to rise, and the concentration then restored to its initial value less feedback effects. The reactor will then continue to operate at the new higher output level. Because of the nuclear reactor dynamics to be discussed in more detail below, the direction of control rod movement or the change in concentration of the chemical, such as boric acid, must be reversed before the new power level has been attained. Normally, this reversal is not accomplished as one continuous movement but in a series of short reversals interrupted by intervals in which the rod position or chemical concentration is kept constant. Once the reversal in the direction of rod travel or the change in chemical concentration has been initiated, the power may continue to build up but at a slower rate. If the change was performed properly, the power level will climb to the desired new operating level without overshoot or undershoot. At the present time decisions concerning control mechanism reversal are made by the licensed reactor operator based on knowledge of the dynamics of the reactor and the experience of the operator. These decisions are complicated because (1) the equations of reactor dynamics are non-linear, (2) the rate of change of power depends on both the net change in the control mechanism's position or concentration and its rate of change, (3) there are feedback effects between the reactor power and the rate at which power is changing, and (4) control mechanisms have non-linear strengths and finite speeds.

It is therefore an object of this invention to provide a closed-loop control system for regulating reactor power in a nuclear reactor.

It is a further object of the invention to provide such a closed-loop system which results in the attainment of new power levels without overshoot (or conversely, undershoot) beyond that allowed by specified tolerance bands.

It is yet another object of the invention to provide such a closed-loop controller which at all times restricts the net reactivity so that it is always possible to rapidly make the reactor period infinite whenever required.

Still another object of the invention is a closed-loop nuclear reactor control scheme that guarantees that no action initiated by any automatic control law will ever result in a challenge to the existing nuclear safety system provided that the decision of the control law is subject to review by the control scheme.

Yet another object of the invention is a closed-loop power controller which recognizes that reactor dynamics are non-linear, that the rate of change of reactor power depends both on the net reactivity and the rate of change reactivity, that the reactivity is dependent on the reactor power through various feedback mechanisms, and that control mechanisms have finite speeds as well as position-dependent, non-linear worths.

SUMMARY OF THE INVENTION

These and other objects of the invention are achieved by means of an automatic control system including apparatus for moving a control element such as a control rod or for changing the concentration of soluble neutron absorber (chemical shim) for altering the power level in a nuclear reactor. Motion of a control element or change in chemical concentration of the soluble absorber alter the reactivity balance of the reactor. A computer, preferably a digital computer, is provided to compute repeatedly at intervals, the two functions $[\rho - |\dot{\rho}|/\lambda_e]/|\dot{\rho}|$ and $\tau_i \ln(P_F/P_i)$. The first term is the time required to reduce whatever reactivity is present in the reactor to the amount allowed by an absolute reactivity constraint $<|\dot{\rho}|_{max} \leq \lambda_3 \rho \leq |\dot{\rho}|_{max}$. The second term is the time remaining to attain the desired power level. The control law is such that motion of the control mechanism or change in concentration of the soluble absorber is either halted or reversed when these two functions become equal. This control method results in the attainment of the new power level without overshoot (or conversely undershoot) beyond that allowed by specified tolerance bands.

BRIEF DESCRIPTION OF THE DRAWING

The invention disclosed herein will be understood better with reference to the drawing of which.

DESCRIPTION OF THE PREFERRED EMBODIMENT

Figure 1:
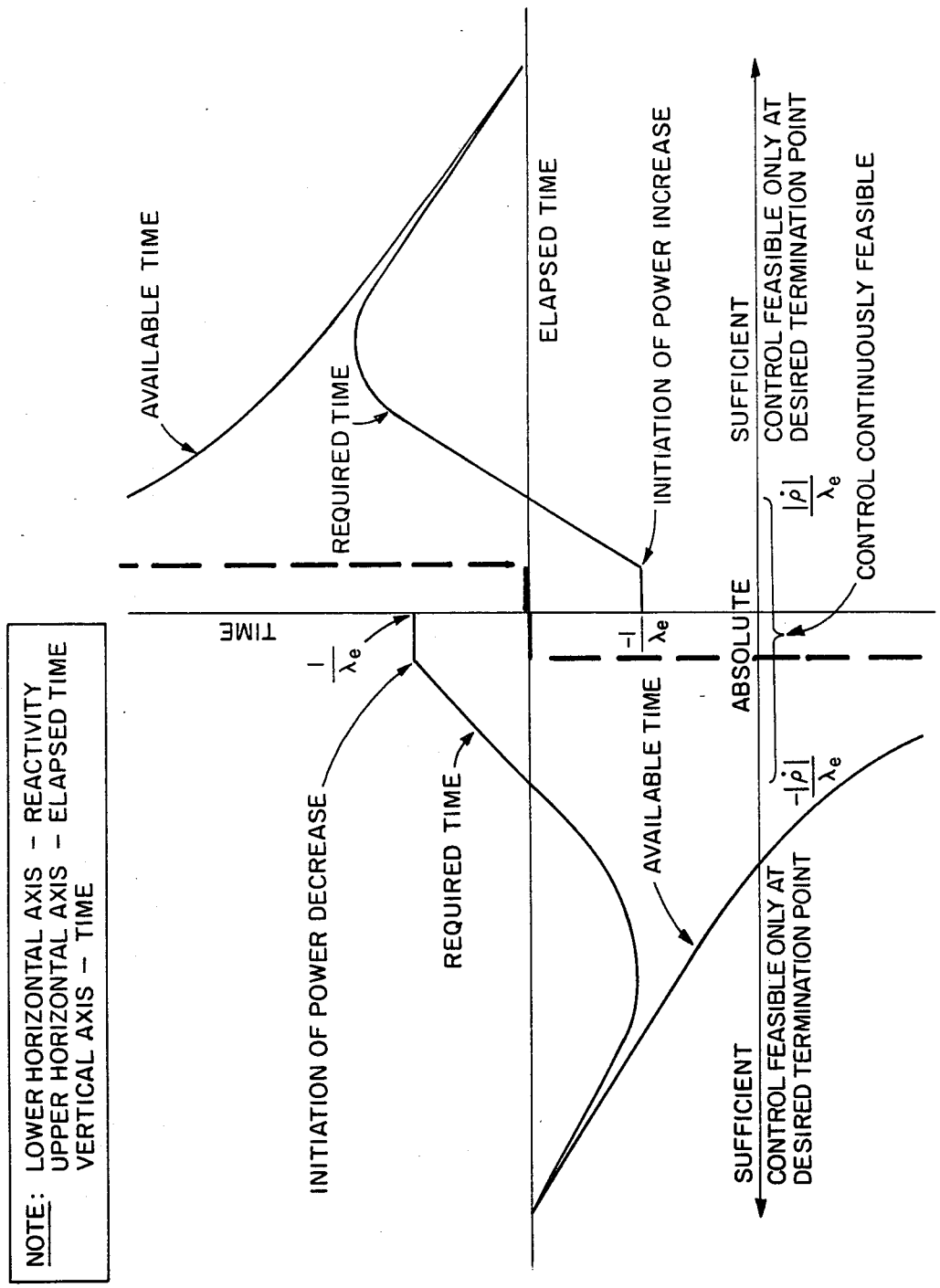
FIG. 1 is a schematic diagram showing the relation between the absolute and sufficient constraints disclosed herein.

As an aid to understanding the present invention, a brief discussion of the underlying theory will now be given. First of all, the non-linear digital controller disclosed herein applies to reactors that can be described by the point kinetics equations. These equations are useful for describing reactors that have either close-coupled cores or cores characterized by long mean free paths for neutron diffusion. Such reactors include research and test reactors, small commercial reactors, graphite-moderated reactors, and reactors for spacecraft. Extension of the concept to large light-water reactors would involve use of the spatially-dependent kinetics equations.

The point kinetics equations are cumbersome to use for control purpose because they are written in terms of neutron and precursor concentrations, neither of which is readily measurable. Accordingly, it is more useful to combine these two point kinetics equations to obtain the dynamic period equations which describe the reactor kinetics in terms of power, period, and reactivity. The "exact form" of these equations is:

$$\tau(t) = \frac{\overline{\beta} - \rho(t)}{\dot{\rho}(t) + \lambda_e(t)\rho(t) + \frac{\dot{\lambda}_e(t)}{\lambda_e(t)}(\overline{\beta} - \rho(t))} \quad (1)$$

$$A(t) = \int_o^t d\sigma/\tau(\sigma)$$

$$P(t) = P_o e^{A(t)} \quad$$

where $\tau(t)$ is the dynamic reactor period, $\overline{\beta}$ is the effective delayed neutron fraction, $\rho(t)$ is the net reactivity, $\dot{\rho}(t)$ is the rate of change of the net reactivity, $\lambda_e(t)$ is the effective, one-group decay constant, $\dot{\lambda}_e(t)$ is the rate of change of the effective, one-group decay constant, $P_o$ is the initial power level, and $P(t)$ is the current power level. These terms may be defined as:
 (a) Period—The time required for the reactor power to increase by a factor of "e" or 2.718.
 (b) Reactivity—The fractional change in the neutron population per neutron generation. (Note: The term "generation" is artificial but nevertheless useful to an initial explanation of reactivity. Neutrons are produced at high energy by fission. They must (1) decrease their energy and (2) diffuse through the reactor core before they can be absorbed in uranium and cause fissions. The time required for a neutron to complete the cycle (birth, energy decrease, diffusion, absorption) is the generation time.
 (c) Asymptotic Period—The period that a reactor ultimately attains in the presence of constant reactivity. This is the period associated with the well-known Inhour equation.
 (d) Dynamic Period—The period that exists in the presence of changing reactivity. This is the period associated with the dynamic period equation.
 (e) Reactivity Balance—Many physical phenomena may affect the reactivity. These include the control mechanisms that are used to initiate power changes, the temperature of the reactor's moderator, the temperature of the coolant, the fuel temperature, the void fraction in the coolant, and certain fission products including xenon and samarium. The effect of each of these factors can be determined by using known combinations of theoretical and empirical techniques. The total reactivity present as a function of time can be determined by summing the reactivities associated with each factor relative to some initial condition, usually an exactly critical reactor. Such a calculation is referred to as a reactivity balance.
 (f) Net Reactivity—The net reactivity is the total reactivity present. This quantity is the end product of a reactivity balance calculation. (Note: Relative to the controller disclosed herein, it functions by restricting the net reactivity to that which can be controlled by altering the reactivity associated with the control mechanisms.)
 (g) One-Group Decay Constant—There are several types of neutrons in a nuclear reactor including prompt, delayed, and source neutrons. The generation time for the prompt ones is 100 microseconds. There are six distinct groups of delayed neutrons each with a characteristic half-life and decay constant. There are also several groups of source neutrons. The equations of reactor dynamics become mathematically tractable if they are written in terms of a single effective decay constant instead of different ones for each group of delayed and/or source neutrons. This effective one-group decay constant is a weighted average of each of the six group's true decay constant.
 (h) Effective Delayed Neutron Fraction—The fraction of thermalized (low energy) neutrons that originated as delayed neutrons.
 (i) Prompt Neutron—A neutron produced directly by the fission process.
 (j) Delayed Neutron—A neutron produced following the radioactive decay by beta particle emission of a fission product. Fission products that undergo this process are called *precursors*. There are six distinct groups of precursors, one for each group of delayed neutrons.

The derivation of equation (1) from the point kinetics equations requires that the prompt-jump approximation be made. This means that the time derivative of the neutron population is neglected. The prompt-jump approximation is completely justifiable because the reactivities being considered are substantially less than the effective delayed neutron fraction and the rate of insertion of reactivity is sufficiently slow so that no appreciable change occurs over the prompt neutron lifetime. The effective, one-group decay constant $\lambda_e(t)$ is treated as being time-dependent and is therefore defined in terms of precursor concentrations rather than precursor yields. Specifically, $$\lambda_e(t) = \frac{\Sigma \lambda_i C_i(t)}{\Sigma C_i(t)} \text{ for } i = 1; N$$

where N is the number of delayed neutron groups. This approach is desirable because the relative concentrations of the various delayed neutron precursor groups change depending on whether power is being increased or decreased. (Note: The term "one-group approximation" as used in the literature means selecting a single value for $\lambda_e$. This approach is not accurate. Treating $\lambda_e$ as time-dependent as described herein results in no loss of accuracy.) Simulation studies have shown that under certain circumstances solving the exact form of the dynamic period equation (1) is as accurate as solving the point kinetics equations provided that the $\lambda_e(t)$ and $\dot{\lambda}_e(t)$ terms can be determined. These terms cannot be obtained in real time with complete accuracy using present generation microcomputers. Accordingly, it is useful to simplify equation (1) to obtain:

$$\tau(t) = \frac{\overline{\beta} - \rho(t)}{\dot{\rho}(t) + \lambda_e(t)\rho(t)} \quad (2)$$

Equation (2) is the "approximate" form of the dynamic period equation. (Note: The nomenclature "exact" and "approximate" form of the dynamic period equation is new with the disclosure described herein. As given in the literature, the dynamic period equation is normally written in the form of equation (2) except that $\lambda_e(t)$ is not taken as time dependent.) The time-dependent effective, one-group decay constant is approximated herein by the value that it approaches when the reactor is on an asymptotic period. This value is denoted by the symbol $\lambda_e°(t)$. This substitution is desirable because $\lambda_e°(t)$ can be readily calculated if the net reactivity is known. It is warranted because it results in conservative decisions for power increases. Also, the difference between the two terms is, for the transients of interest, quite small. (Note: A reactor is on an asymptotic period if the reactivity has been constant for an extended interval, usually one-half to several minutes depending on the amount of reactivity.)

Obtaining equation (2) from equation (1) required that the third term in the denominator of equation (1) be dropped. The justification for this assumption is that equation (2) is to be used to predict when the direction of control mechanism motion or soluble absorber concentration should be changed rather than to precalculate the reactor's dynamic response. For the transients of interest, the third term in the denominator of equation (1) changes sign almost immediately following a change in the direction of the control mechanism. Hence, it need not be considered in a decision on when to change that direction.

Equation (2) is thus a means of relating the reactor period to the reactivity and the rate of change of reactivity. The next consideration is to recognize that the rate at which reactivity can be removed from a reactor is, under non-scram conditions, limited to the speed of movement of the control mechanism. Since the rate of change of reactor power is dependent on both the reactivity and its rate of change, the fact that the rate of removal of reactivity is finite means that the process of removing excess reactivity must be begun in advance of attaining the desired power. Otherwise, there will be a power overshoot (or, for power decreases, an undershoot).

This observation is the basis for defining a reactor together with a designated control mechanism as being "feasible to control" if it is possible to transfer the system from a given power level and period to a different desired steady state power level without overshoot (or, conversely, undershoot) beyond that allowed by specified tolerance bands. Hence, not all states are allowable intermediates through which the system may pass. Excluded are states representing actual overshoots and states from which overshoots could not be averted by manipulation of the designated control mechanism. These concepts can be quantified by use of the approximate form of the dynamic period equation, equation (2). That equation shows that control will be feasible only if the reactivity is restricted so that it is possible to terminate a power transient by reversing the direction of control mechanism motion or soluble absorber concentration and thereby making the period infinite. Control is thus feasible throughout the entire transient if an "absolute reactivity constraint" is satisfied. That is, if, $$-|\dot{\rho}|_{max} \leq \lambda_e \rho \leq |\dot{\rho}|_{max} \quad (3)$$

where $\rho$ is the current value of the net reactivity and where the quantity $|\dot{\rho}|_{max}$ is the maximum available rate of reactivity change were the designated control mechanism to be moved or soluble absorber concentration changed. (Note: The term "designated" implies the means of control assigned to the closed-loop controller.) Control is said to be feasible at the desired termination point of a transient if a "sufficient reactivity constraint" is satisfied, namely, for power increases, $$[\rho - |\dot{\rho}|/\lambda_e]/|\dot{\rho}| \leq \tau_i \ln(P_F/P_i) \quad (4)$$

where $P_F$ and $P_i$ are the desired and current power levels respectively, $\tau_i$ is the shorter of either the observed or the asymptotic period corresponding to the net reactivity, $|\dot{\rho}|$ is the maximum available rate of change of reactivity, and $\rho$ is the current value of the net reactivity. The term on the left in inequality (4) is the time required to reduce whatever reactivity is present to the amount allowed by the absolute constraint of inequality (3). The term on the right in inequality (4) is the time remaining to attain the desired power. In both inequalities (3) and (4), all quantities are time-dependent and $\lambda_e°(t)$ is substituted for $\lambda_e(t)$. It should be noted that, as a safety measure, the controller is programmed so that the right side of (4) is to be set to zero should $P_i$ ever exceed $P_F$. Also, for power decreases, the sufficient constraint is normally written as:

$$[\rho + |\dot{\rho}|/\lambda_e]/|\dot{\rho}| \leq \tau_i \ln(P_i/P_F) \quad (5)$$

The absolute reactivity constraint of inequality (3) and the sufficient reactivity constraint of inequalities (4) and (5) along with the concepts of feasibility of control as well as the concepts of available and required time form the basis for the non-linear digital controller disclosed herein. It is important to realize that if the absolute constraint is observed, control will always be feasible. Hence, by merely reversing the direction of travel of the designated control mechanism, the period can be made rapidly infinite and the power transient halted at any time during the transient. If the sufficient constraint is always observed, then by reversing the direction of control mechanism motion the power transient can be halted at the time when the desired power is reached. It should be noted that the derivation of these control relations has not required the linearization of either the equations of reactor dynamics nor the control mechanism reactivity worth curves.

FIG. 1 illustrates the relation between the absolute reactivity constraint of inequality (3) and the sufficient reactivity constraints of inequalities (4) and (5). Control is guaranteed to be continuously feasible if the reactivity is within the bounds of the absolute constraint. These bounds are not symmetric because the value of the effective, one-group decay constant depends on whether power is being raised or lowered. Once the value of the reactivity exceeds these bounds, control is guaranteed to be feasible only at the desired power level.

Figure 2:
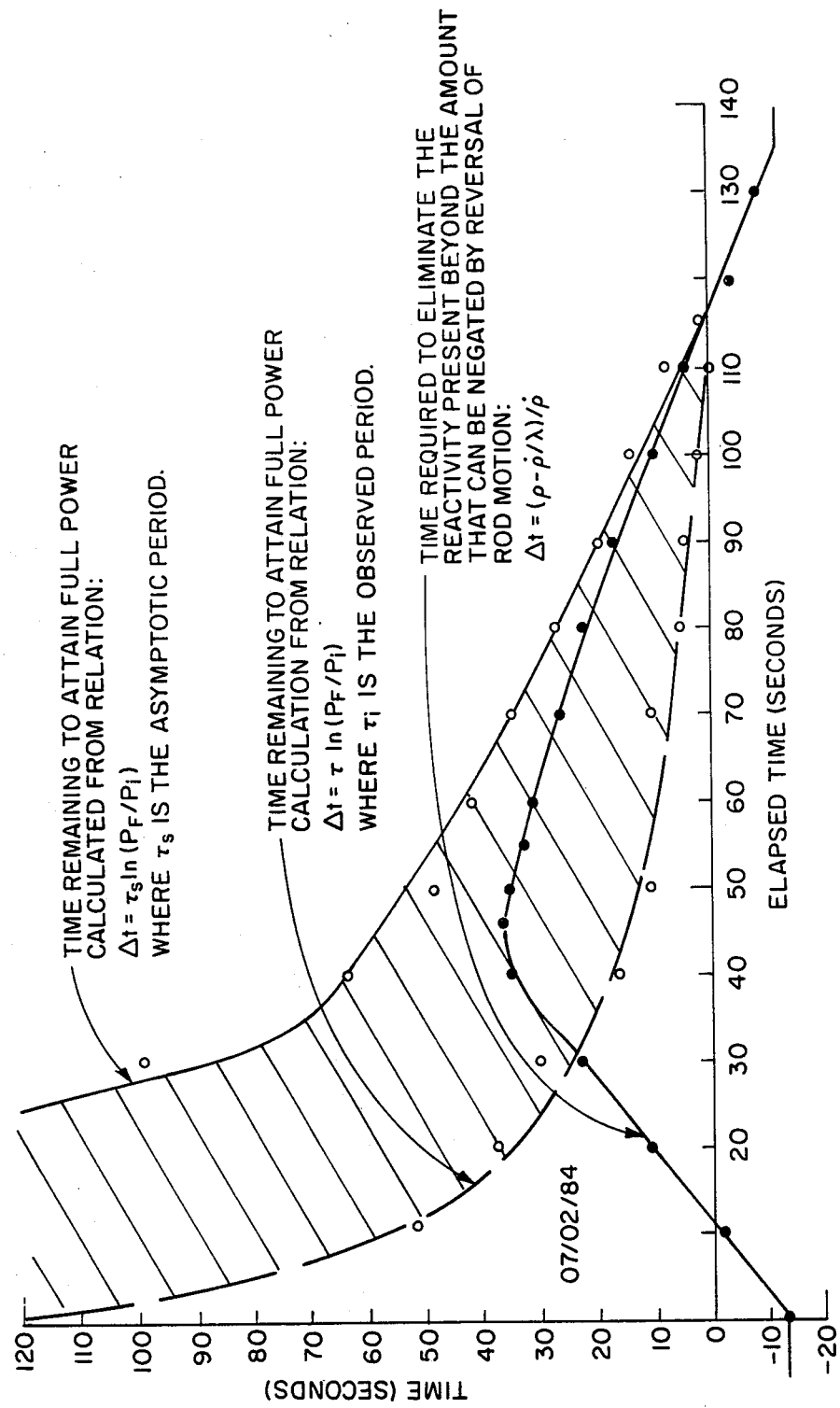
FIG. 2 is an examination of the sufficient constraint showing a graph of available time and required time as a function of elapsed time.
Figure 3:
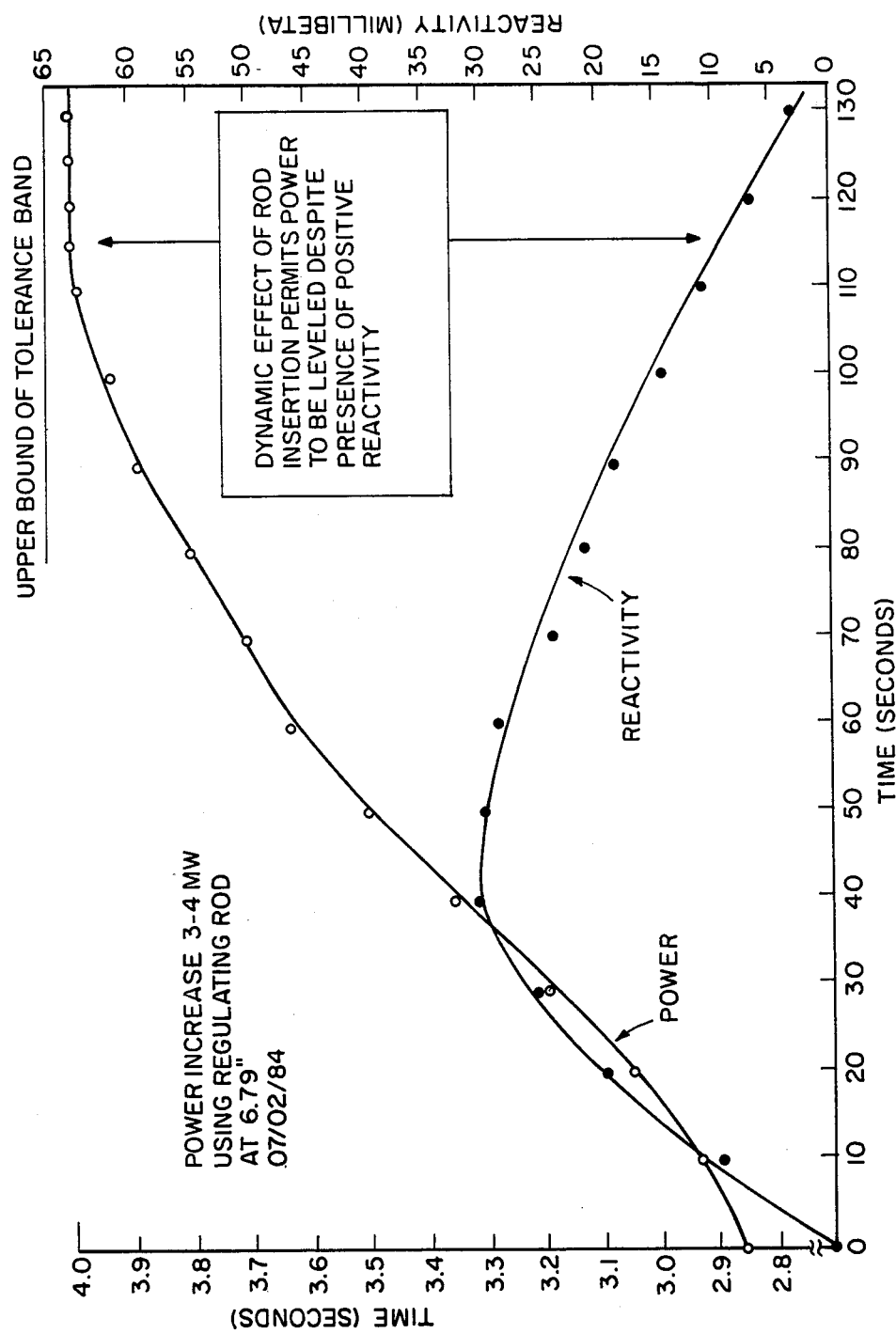
FIG. 3 is a graph showing both reactivity and power as a function of time.

The present closed-loop control scheme is based on an evaluation of the values of the left and right terms in inequalities (4) and (5) at periodic intervals during a reactor power change. FIG. 2 shows both the time required to reduce reactivity to the amount allowed by the absolute constraint, the left side of inequality (4) and the time available to attain a desired power, the right side of inequality (4). Recall that the period in inequality (4) was defined as the shorter of either the observed or the asymptotic periods. The right side of the constraint is shown plotted in terms of each of these periods. The shaded region is the band formed by these two curves. Once the required time enters this band, a change in the direction of control mechanism motion can be expected. As long as the required time does not cross out of the band, no overshoot will occur. For an experimental run in which reactor power was raised from 2.86 to 4.0 megawatts using the constraint of inequality (4), the corresponding power and reactivity changes with time are shown in FIG. 3. As shown in FIG. 3, initially the reactivity is zero and since there is some positive rate of change of reactivity available, the left side of the constraint of inequality (4) is negative. The right side of the constraint is infinite since initially the period is infinite because the reactor is at steady state. Once the transient commences, the reactivity becomes positive. The left side of the constraint becomes less negative, passes through zero and then becomes positive indicating that some finite interval of time is now required before the transient can be halted. The right side of the constraint tends towards zero because the period is becoming shorter and the power is rising.

When the time required to restore continuous feasibility of control (that is, the time required to reduce reactivity to the amount allowed by the absolute constraint) equals the time remaining to attain full power, continued rod withdrawal is prohibited and rod insertion is begun. The left side of the constraint is continuously bounded by the right side (as calculated using the asymptotic period) indicating that the control rod is being more or less constantly inserted. The left side of the constraint becomes zero after 116 seconds indicating that control is again continuously feasible. Note that the power levels off at 4.0 megawatts at the same time. It should be noted that there was no power overshoot and that the dynamic effect of rod insertion permitted power to be leveled despite the presence of positive reactivity. The relation represented by the sufficient constraint of inequality (4) must be evaluated frequently if it is to be effective. A sampling interval of one second is suitable. It is noted that such a control scheme is capable of both raising and lowering the power in a safe, efficient manner while using a control mechanism of varying differential worth. Furthermore, the reactivity constraints (either the absolute or the sufficient form) are a necessary condition for the automatic control of reactor power. Experimental studies have also shown that the use of controllers based on the sufficient reactivity constraint can prevent overshoots due either to attempts to control a transient with a control rod of too low a differential worth or due to failure to properly estimte when to begin rod insertion.

Figure 4:
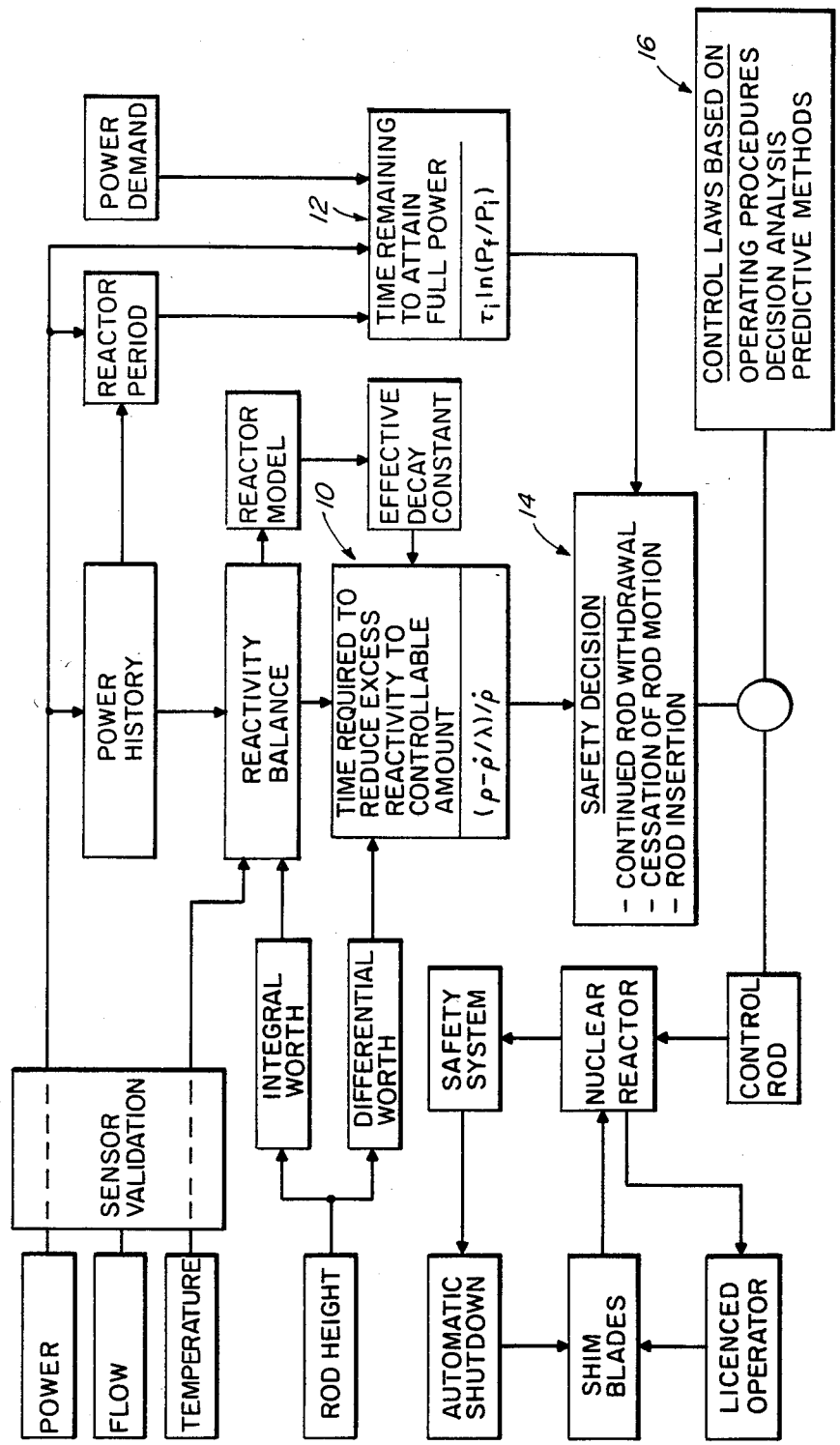
FIG. 4 is a schematic block diagram of the non-linear digital controller disclosed herein.

FIG. 4 is a schematic diagram showing the internal structure of the non-linear digital control system disclosed herein, its relation to other control laws, and its relation to the existing nuclear safety system and to the licensed operator. It should be noted that the left side of the sufficient constraint of inequality (4) is computed at block 10 and the right side of the constraint is computed in block 12. These two values are compared in the safety decision block 14 to decide whether to permit continued rod withdrawal, to require cessation of rod motion, or to require the initiation of rod insertion. These actions alter the reactivity balance. When the two values are equal, the net reactivity is limited. Thus, the non-linear digital controller guarantees that there will be no challenge to the nuclear safety system regardless of the actual form of the control law being used. Some of the types of control laws that have been used in conjunction with the controller disclosed herein are shown in block 16.

Figure 5:
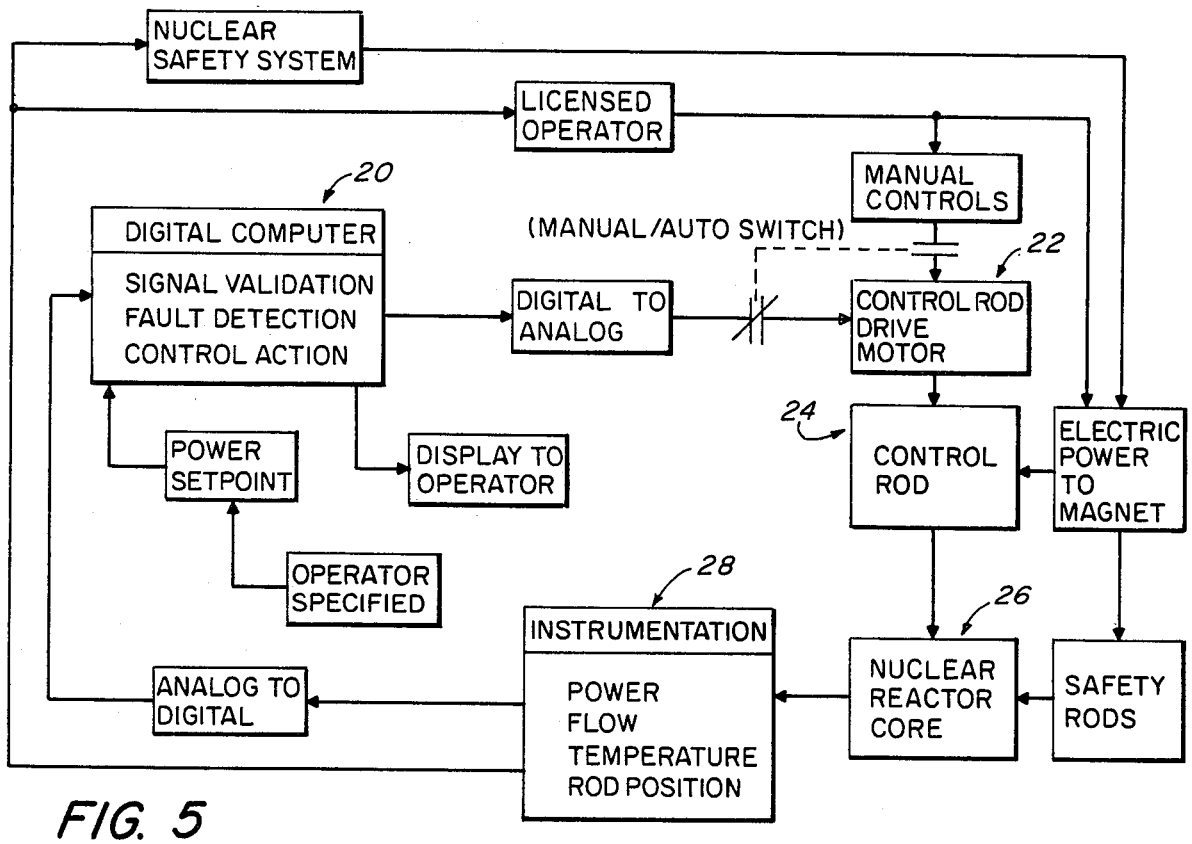
FIG. 5 is a schematic illustration of a physical implementation of the controller disclosed herein.

FIG. 5 is a schematic illustration of the apparatus for effecting the control scheme outlined above. A digital computer 20 will compute the left and right sides of inequality (4) at time intervals such as one second using as inputs the paramters shown in block 28. The output of the computer 20 is used to control a motor 22 which is arranged to advance or retract a control rod 24 with respect to a reactor core 26. As discussed above, when the left and right hand sides of inequality (4) become equal, the direction of motion of the control rod 24 is altered so that a new power level is attained without overshoot (or conversely undershoot) beyond that permitted by specified tolerance bands.

Figure 6:
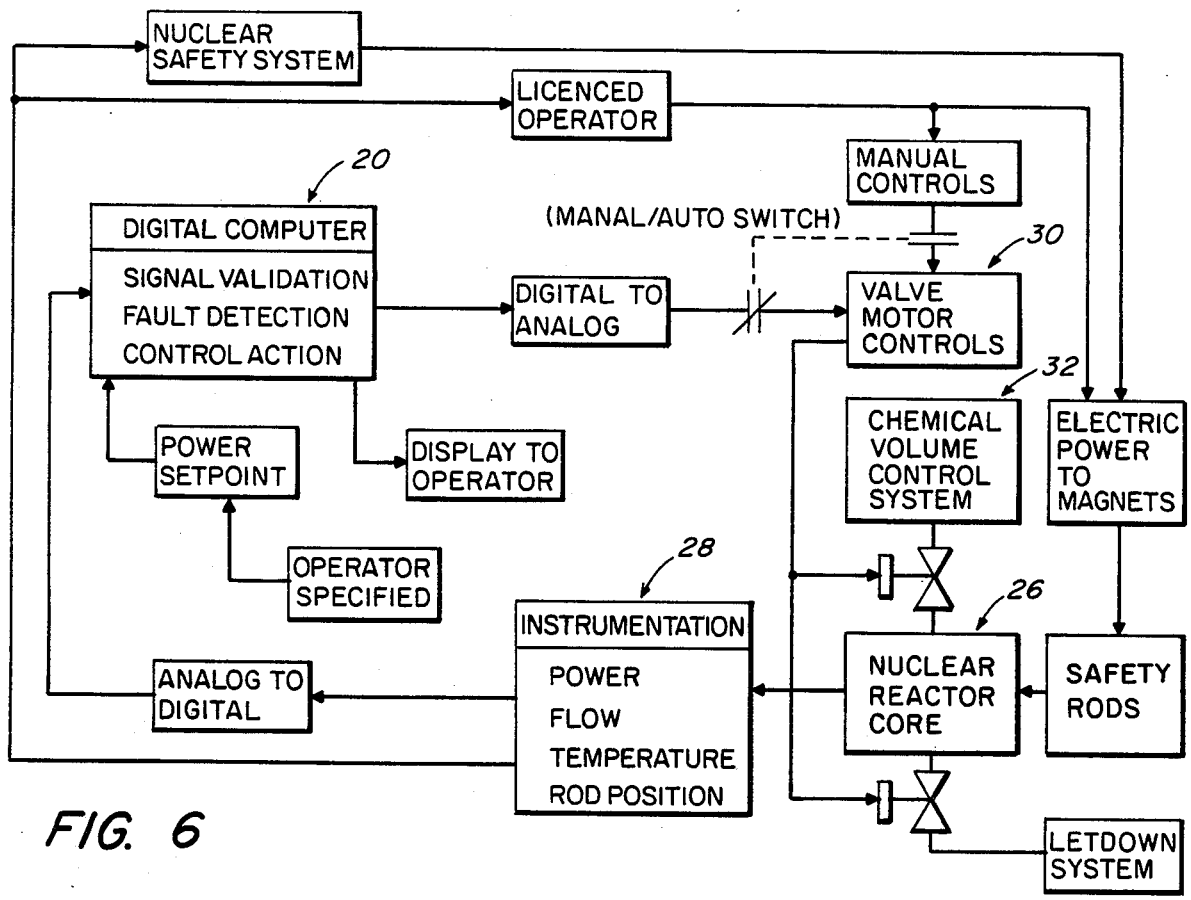
FIG. 6 is a schematic illustration of a physical implementation of the controller disclosed herein utilizing a soluble neutron absorber as the control element.

FIG. 6 is substantially the same as FIG. 5 with the use of valve apparatus 30 for changing the concentration of a soluble neutron absorber (chemical shim) 32. When the left and right sides of the inequality (4) become equal, the change in the concentration of the soluble absorber (chemical shim) 32 is adjusted so that a new power level is attained as discussed above.

It is thus seen that the objects of this invention have been achieved in that there has been disclosed the apparatus and method for the closed-loop control of nuclear reactor power. The disclosed control system has resulted in a general method that guarantees that no action initiated by the automatic control system will ever result in a challenge to the existing nuclear safety system. Furthermore, the controller is capable of raising and lowering power in a safe, efficient manner without power overshoots. It is recognized that modifications and variations will occur to those skilled in the art and it is intended that all such modifications and variations be included within the scope of the appended claims.

What is claimed is:

1. Apparatus for closed-loop control of reactor power in a nuclear reactor in which power level is altered by adjustments in reactivity balance comprising:
   means for adjusting said reactivity balance; and
   computing apparatus for computing repeatedly at intervals the two functions $[\rho - |\dot{\rho}|/\lambda_e]/|\dot{\rho}|$ and $\tau_i \ln(P_f/P_i)$; whereby net reactivity is limited by adjusting said reactivity balance when the two functions become equal.

2. The apparatus of claim 1 wherein said means for adjusting reactivity balance includes apparatus for moving a control element.

3. The apparatus of claim 1 wherein said means for adjusting reactivity balance includes apparatus for changing the concentration of a soluble absorber (chemical shim).

4. The apparatus of claim 1 wherein said interval is of the order of one second.

5. Method for closed-loop control of reactor power in a nuclear reactor in which power level is altered by adjustments in reactivity balance comprising:
   computing repeatedly at intervals the two functions $[\rho - |\dot{\rho}|/\lambda_e]/|\dot{\rho}|$ and $\tau_i \ln(P_f/P_i)$ and adjusting said reactivity balance to limit net reactivity when the two functions become equal.

6. The method of claim 5 wherein said interval is on the order of one second.

7. Apparatus for closed-loop control of reactor power in a nuclear reactor in which power level is altered by movement of a control element comprising;
   apparatus for moving said control element; and computing apparatus for computing repeatedly at intervals the two functions $[\rho-|\dot{\rho}|/\lambda_e]/|\dot{\rho}|$ and $\tau_i \ln(P_f/P_i)$; whereby the direction of motion of said control element is altered when the two functions become equal.

8. Apparatus of claim 7 wherein said interval is of the order of one second.

9. Apparatus of claim 7 wherein said control element is a control rod.

10. Apparatus of claim 7 wherein said control element is a shim blade.

11. Method for closed-loop control of reactor power in a nuclear reactor in which power level is altered by movement of a control element comprising:
  computing repeatedly at intervals the two functions $[\rho-|\dot{\rho}|/\lambda_e]/|\dot{\rho}|$ and $\tau_i \ln(P_f/P_i)$; and altering the direction of the motion of said control element when the two functions become equal.

12. The method of claim 11 wherein said interval is of the order of one second.

13. Apparatus for closed loop control of reactor power in a nuclear reactor in which power level is altered by adjustment of the concentration of a soluble absorber (chemical shim) comprising:
  apparatus for changing the concentration of said soluble absorber; and
  computing repeatedly at intervals the two functions $[\rho-|\dot{\rho}|/\lambda_e]/|\dot{\rho}|$ and $\tau_i \ln(P_f/P_i)$ whereby the concentration of said soluble absorber (chemical shim) is altered when the two functions become equal.

14. The apparatus of claim 13 wherein said interval is of the order of one second.

15. Method for closed-loop control of reactor power in a nuclear reactor in which power level is altered by adjustment of the concentration of soluble absorber (chemical shim) comprising:
  computing repeatedly at intervals the two functions $[\rho-|\dot{\rho}|/\lambda_e]/|\dot{\rho}|$ and $\tau_i \ln(P_f/P_i)$; and
  adjusting the concentration of said soluble absorber (chemical shim) when the two functions become equal.

16. The method of claim 15 wherein said interval is of the order of one second.

* * * * *

UNITED STATES PATENT AND TRADEMARK OFFICE
CERTIFICATE OF CORRECTION

PATENT NO. : 4,637,911
DATED : January 20, 1987
INVENTOR(S) : John A. Bernard, Jr.

It is certified that error appears in the above-identified patent and that said Letters Patent are hereby corrected as shown below:

Column 2, line 26, the equation "$<|\dot{\rho}|max \leq \lambda_3 \rho \leq |\dot{\rho}|max$" should be -- $-|\dot{\rho}|max \leq \lambda_e \rho \leq |\dot{\rho}|max$ --.

Column 4, line 42, after "1" the semicolon (;) should be a comma (,).

This certificate supersedes Certificate of Correction issued July 7, 1987.

Signed and Sealed this

Thirteenth Day of October, 1987

Attest:

DONALD J. QUIGG

Attesting Officer

Commissioner of Patents and Trademarks